US011816187B2

(12) United States Patent
Bhuyan et al.

(10) Patent No.: US 11,816,187 B2
(45) Date of Patent: Nov. 14, 2023

(54) ANOMALY DETECTION IN EVENT-BASED SYSTEMS USING IMAGE PROCESSING

(71) Applicant: INTUIT INC., Mountain View, CA (US)

(72) Inventors: Ranadeep Bhuyan, Bangalore (IN); Sudipto Ghosh, Bagalore (IN); Madhura Vaidya K V, Bangalore (IN)

(73) Assignee: INTUIT INC., Mountain View, CA (US)

( * ) Notice: Subject to any disclaimer, the term of this patent is extended or adjusted under 35 U.S.C. 154(b) by 350 days.

(21) Appl. No.: 17/245,759

(22) Filed: Apr. 30, 2021

(65) Prior Publication Data

US 2022/0351001 A1    Nov. 3, 2022

(51) Int. Cl.
*G06F 18/23* (2023.01)
*G06F 16/17* (2019.01)
*G06N 3/08* (2023.01)
*G06F 18/214* (2023.01)

(52) U.S. Cl.
CPC .......... *G06F 18/23* (2023.01); *G06F 16/1734* (2019.01); *G06F 18/2155* (2023.01); *G06N 3/08* (2013.01)

(58) Field of Classification Search
CPC .. G06F 16/1734; G06F 18/2155; G06F 18/23; G06N 20/00; G06N 3/0464; G06N 3/08; G06N 3/084; G06N 3/0895; G06V 10/768
See application file for complete search history.

(56) References Cited

U.S. PATENT DOCUMENTS

| 2016/0034712 | A1* | 2/2016 | Patton | G06Q 50/01 726/28 |
|---|---|---|---|---|
| 2017/0185872 | A1* | 6/2017 | Chakraborty | G06V 20/52 |
| 2017/0220887 | A1* | 8/2017 | Fathi | G06T 7/55 |
| 2018/0114334 | A1* | 4/2018 | Desai | G06V 10/82 |
| 2018/0174671 | A1* | 6/2018 | Cruz Huertas | G16H 10/60 |

(Continued)

OTHER PUBLICATIONS

Shin Ando, "Ensemble anomaly detection from multi-resolution trajectory features," Aug. 1, 2013, Data Mining and Knowledge Discovery vol. 29 (2015), pp. 42-64.*

(Continued)

*Primary Examiner* — Omar S Ismail
(74) *Attorney, Agent, or Firm* — DLA PIPER LLP (US)

(57) ABSTRACT

At least one processor may capture a plurality of image snapshots containing information about a monitored system at a plurality of sequential times, each snapshot having the same vertical and horizontal dimensions. The processor may label the plurality of image snapshots as indicative of an event that took place in the monitored system, may receive additional data describing the event, may cluster the labeled plurality of image snapshots and the additional data using at least one machine learning clustering algorithm, and may merge the clustered plurality of image snapshots and the clustered additional data into merged data. The processors may create a model by processing the merged data using at least one neural network, the model being configured to detect future events of a same type as the event in the monitored system. The processor may store the model in a memory in communication with the processor.

20 Claims, 7 Drawing Sheets

(56) References Cited

U.S. PATENT DOCUMENTS

| | | | |
|---|---|---|---|
| 2019/0045207 A1* | 2/2019 | Chen | H04L 67/12 |
| 2019/0156862 A1* | 5/2019 | Axen | H04N 21/25866 |
| 2019/0354629 A1* | 11/2019 | Zavesky | G06F 16/24575 |
| 2020/0284883 A1* | 9/2020 | Ferreira | G01S 17/10 |
| 2021/0090736 A1* | 3/2021 | Innanje | G16H 40/63 |
| 2021/0118566 A1* | 4/2021 | Wang | G06N 3/08 |

OTHER PUBLICATIONS

Luke Scime, "Anomaly detection and classification in a laser powder bed additive manufacturing processusing a trained computer vision algorithm," Nov. 16, 2017, Additive Manufacturing 19(2018), ScienceDirect, pp. 115-124.*

Van Nhan Nguyen,"Automatic autonomous vision-based power line inspection: A review of current status and the potential role of deep learning," 09the Jan. 2018, Electrical Power and Energy Systems 99 (2018),pp. 108-117.*

Hung Vuy,"Energy-based Models for Video Anomaly Detection,"Aug. 18, 2017, Pattern Recognition and Data Analytics,arXiv: 1708.05211v1 [cs.CV] Aug. 17, 2017,pp. 5-18.*

Kashif Suntan, "Call Detail Records Driven Anomaly Detection and Traffic Prediction in Mobile Cellular Networks,"Aug. 20, 2018, IEEEAccess, vol. 6, 2018,pp. 41728-41731.*

Yinan Wang,"Unsupervised anomaly detection with compact deep features for wind turbine blade images taken by a drone,"Jun. 4, 2019,IPSJ Transactions on Computer Vision and Applications (2019) 11:3,pp. 1-5.*

Sultan et al., "Call Detail Records Driving Anomaly Detection and Traffice Prediction in Mobile Cellular Networks", IEEE Access, vol. 6, 2018, pp. 41728-41737.

Wang, et al., "Unsupervised Anomaly Dection With Compact Deep Features for Wind Turbine Blade Images Taken By Drone", IPJS Trasactions on Computer Vision and Applications, 11:3, 2019, pp. 1-7.

* cited by examiner

ANOMALY DETECTION IN EVENT-BASED SYSTEMS USING IMAGE PROCESSING

BACKGROUND

Anomalies can be present in a variety of systems and can sometimes be detected through analysis of data reported by elements of the systems and/or gathered by monitoring the systems. For example, cyberattacks, fraudulent activity, hardware and/or software problems, and other issues can cause anomalous behavior in computer networks. The anomalous behavior can be detected through network traffic events and/or patterns.

Many monitoring systems capture network traffic as binary packets or text logs from servers and/or domain name system (DNS) elements. There are many ways to analyze these network packets and server/DNS logs. However, these monitoring systems do not provide all data as a whole in a particular view for a time period. In order to get each and every parameter from the network flow, analysts have to rebuild activity at a given time stamp as time series data using co-relations and adding missing data from a variety of sources. This process is not lossless and is also time and labor intensive. However, it has heretofore been generally unavoidable when using network packets and server/DNS logs to reliably identify anomalous network behavior such as fraud attempts and/or cyberattacks.

BRIEF DESCRIPTIONS OF THE DRAWINGS

DETAILED DESCRIPTION OF SEVERAL EMBODIMENTS

Embodiments described herein may use image data for anomaly detection. For example, a network waterfall is a visualization tool that shows multiple data points relevant to network activity correlated with one another in time. A network waterfall snapshot showing the size of the network streams and network payload analysis can indicate whether network activity is indicative of a fraudulent account access or use attempt or other anomalous behavior. Embodiments described herein can automatically capture and process such network waterfall snapshots to detect anomalous behavior significantly faster than prior art monitoring techniques and with extremely high (e.g., 98.9%) accuracy.

For example, in a browser session, any network waterfall for a time stamp is the actual source of truth at that time stamp. Even with great effort and advanced techniques, other monitoring systems could never reproduce the same browser behavior from the captured network packets and/or from any logs. Similarly, for a microservice, each call sequence with all network data and signatures is a waterfall for a client over a time stamp, and it is not possible to replicate the data in the waterfall exactly from the captured network data and/or logs. By taking an image for each time stamp, the disclosed embodiments capture the actual network event, making such data capture lossless.

The disclosed embodiments can be used along with existing and/or novel network packet analysis techniques makes it lossless. For example, the disclosed techniques can provide a first level analysis (e.g., is this activity likely anomalous or not?) with very high confidence due to the high accuracy afforded. Activity that is identified as likely anomalous can then be subjected to second level analysis (e.g., using traditional anomaly detection techniques) to provide a detailed understanding of the anomaly. Given the speed and accuracy of the present techniques, using them as a first level analysis in combination with other anomaly detection techniques allows for more anomalous events to be detected more quickly and for fewer false positives that result in wasted time and processing.

Figure 1:
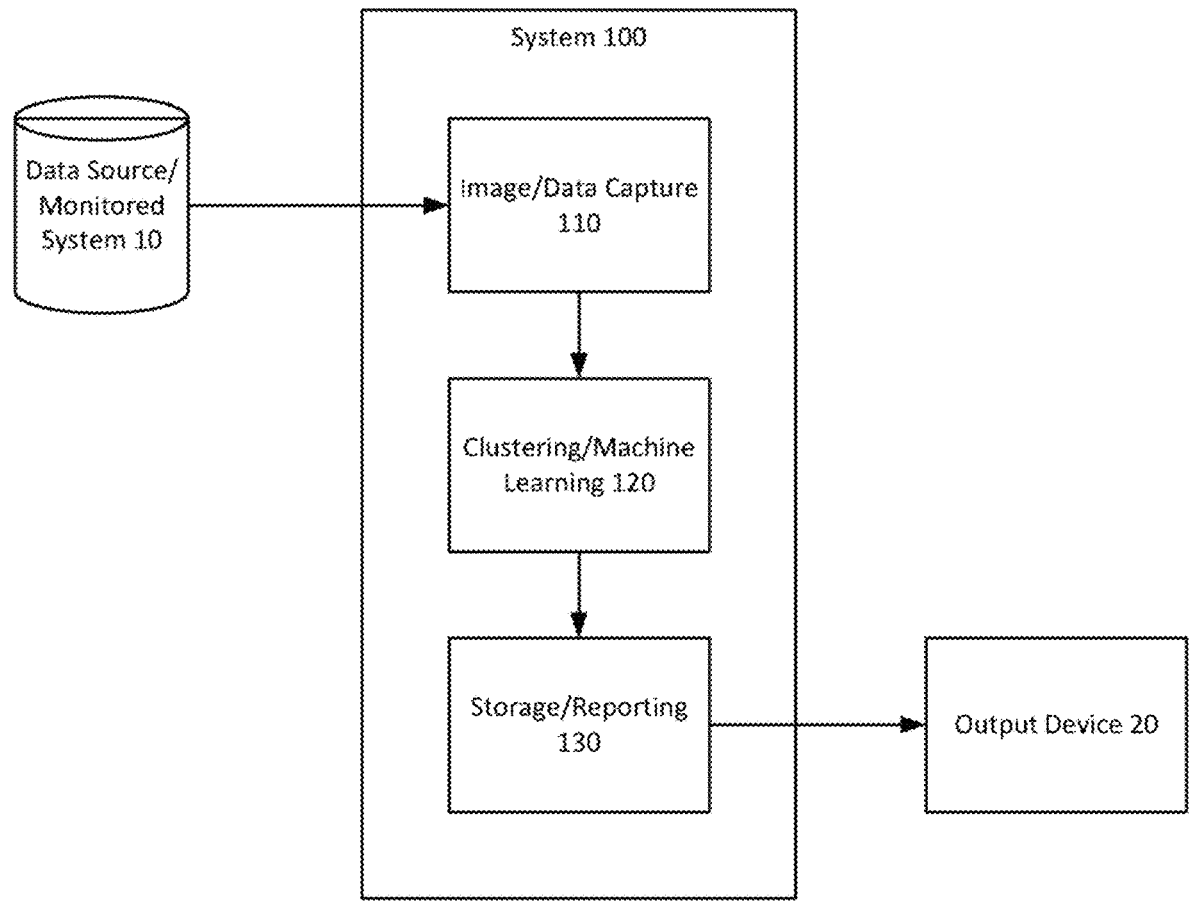
FIG. 1 shows an example event detection system according to some embodiments of the disclosure.

FIG. 1 shows an example event detection system 100 according to some embodiments of the disclosure. System 100 may include a variety of hardware, firmware, and/or software components that interact with one another and with data sources and/or monitored systems 10. For example, system 100 includes image/data capture processing 110, clustering/machine learning (ML) processing 120, and storage/reporting processing 130, each of which may be implemented by one or more computers (e.g., as described below with respect to FIG. 6). As described in detail below, image/data capture processing 110 captures image data (e.g., image data descriptive of a system being monitored 10, such as a computing network or system) and, in at least some cases, additional data related to the system being monitored 10. Using data gathered by image/data capture processing 110, clustering/ML processing 120 can build a model that can be used by ML processing to detect events in the monitored system 10 and/or use the model to detect the events. Storage/reporting processing 130 can store the model in a non-transitory memory of, or accessible to, system 100 and/or report on events detected by clustering/ML processing 120. For example, events may be reported using output device 20, which may be device including a user interface, such as a personal computer, smartphone, tablet, terminal, or any other computing device. FIGS. 2-5 illustrate the functioning of system 100 in detail.

Data source/monitored system 10, output device 20, system 100, and individual elements of system 100 (image/data capture processing 110, clustering/ML processing 120, and storage/reporting processing 130) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while image/data capture processing 110, clustering/ML processing 120, and storage/reporting processing 130 are depicted separately, any combination of these elements may be part of a combined hardware, firmware, and/or software element. Moreover, while one data source/monitored system 10 and one output device 20 are shown, in practice, the data source and the monitored system may be separate from one another and/or there may be multiple data sources, multiple monitored systems, or both. There may be one or plural output devices 20, and output devices 20 may be components of data source/monitored system 10, of system 100, or independent from both.

Figure 2:
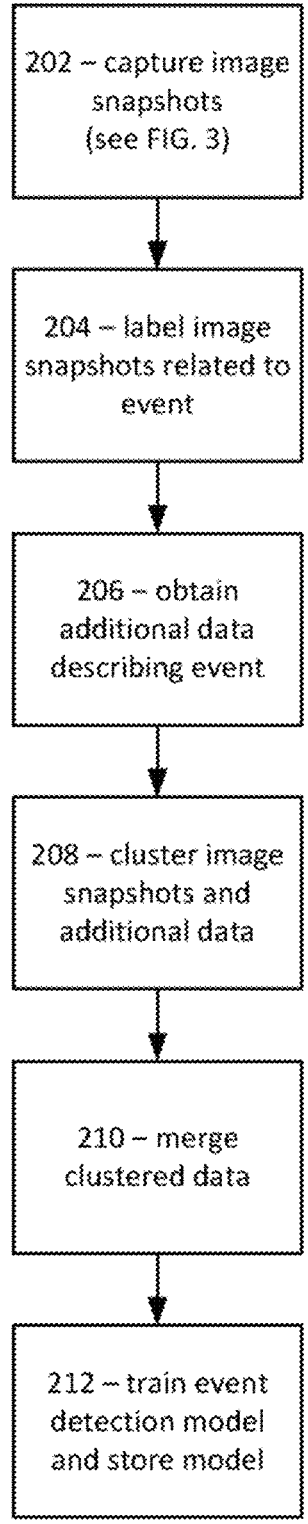
FIG. 2 shows an example model building process according to some embodiments of the disclosure.

FIG. 2 shows an example model building process 200 according to some embodiments of the disclosure. System 100 can perform process 200 to generate an event detection model that can detect events in monitored system 10 based on visual information. For example, network waterfall snapshots can be fed to the model and used to train a model for detecting anomalous network behavior and/or traffic, as described in detail below.

At 202, system 100 can capture image snapshots to be used as training data for the model. An example process for capturing the image snapshots is described below with reference to FIG. 3. To summarize, system 100 may establish a series of capture points (e.g., specified times or a sequence of time intervals) and capture image snapshots (e.g., network waterfall snapshots or other snapshots containing information about monitored system 10) at each capture point. System 100 can capture images at a consistent size scale (e.g., where each image has the same horizontal and vertical (x,y) dimensions), so that recurring elements in the images are at consistent positions and have consistent sizing from snapshot to snapshot.

At 204, system 100 can label the plurality of image snapshots captured at 202. The snapshots can be labeled as indicative of an event that took place in the monitored system 10 during the times at which the snapshots were captured. Any known or novel labeling mechanism and/or scheme can be used, but in some embodiments, the labeling comprises receiving labeling information through at least one user interface (UI). For example, a computing device of system 100 (e.g., see device 600 of FIG. 6) can provide a UI, and a user can manually label image snapshots.

Figure 4A:
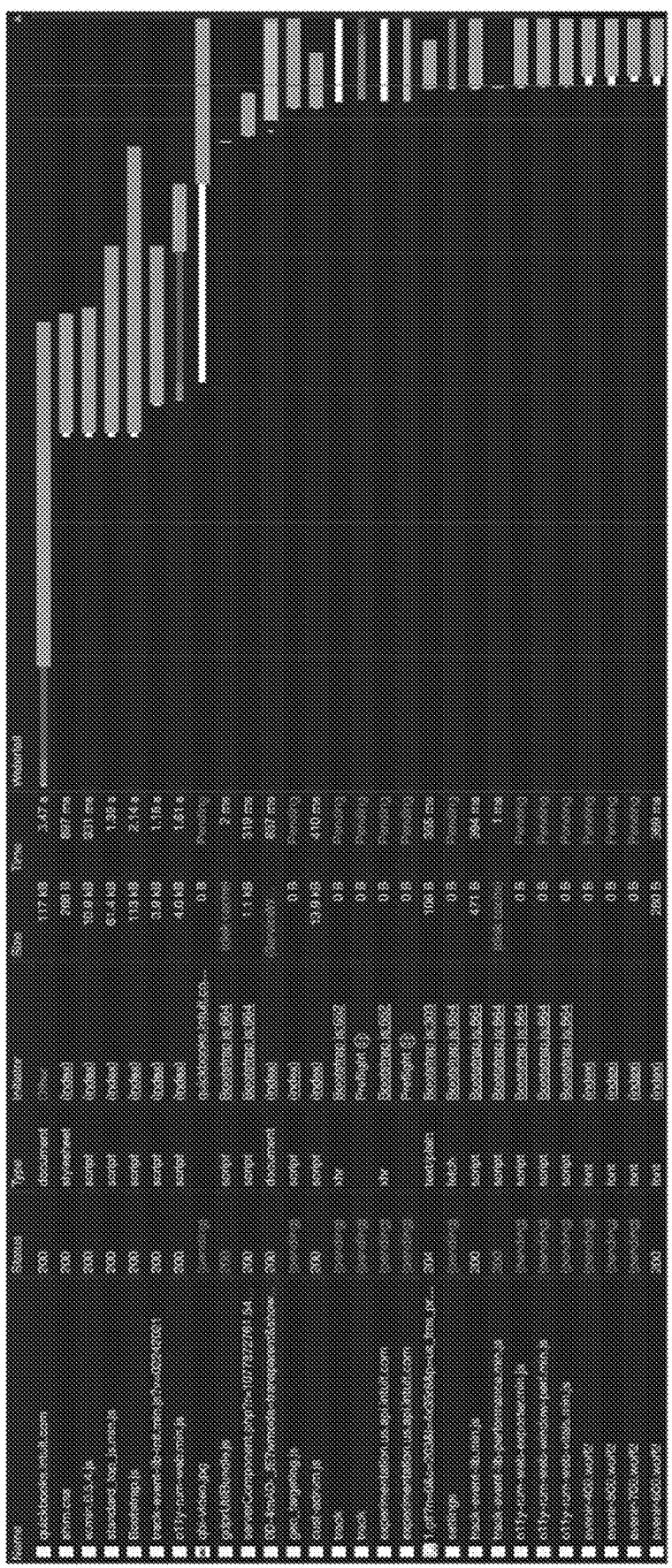
FIGS. 4A and 4B show example network waterfall snapshots according to some embodiments of the disclosure.
Figure 4B:
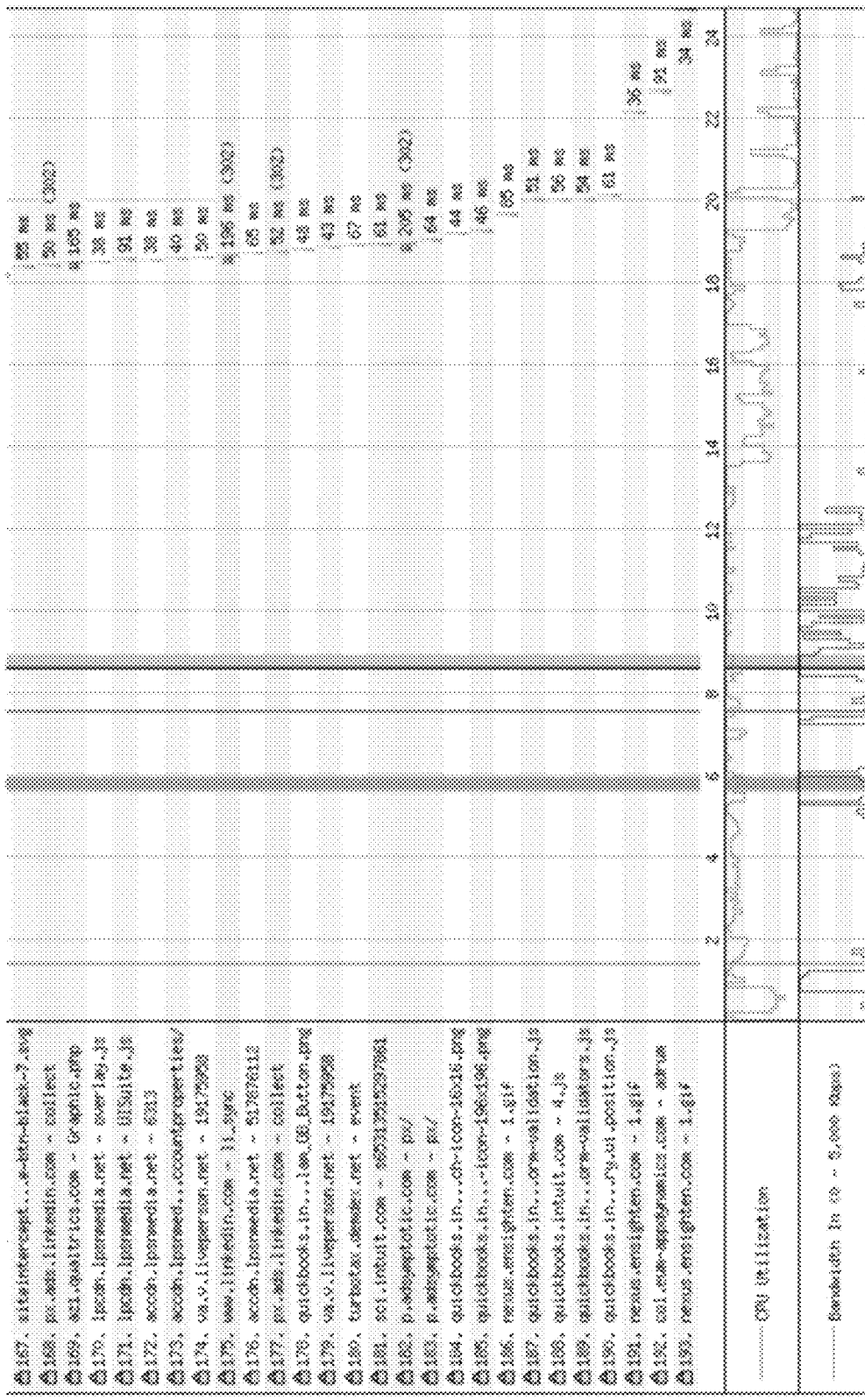

For example, FIGS. 4A and 4B show network waterfall snapshots 400 and 450. The example waterfall snapshots 400/450 include a plurality of rows and columns that illustrate data about specific resources being fetched over a network during a time period (e.g., in response to a request made over the network to load a webpage or other resource). To an expert familiar with network operations, the information displayed in the waterfall snapshots 400/450 may very quickly indicate network issues at a glance. Moreover, an expert may have additional data at their disposal, such as a report of a network anomaly that took place concurrently with the time of capture of a given snapshot. Using their domain knowledge and/or additional data, expert users may be able to authoritatively label image snapshots, such as waterfall snapshots 400 and 450, with meaningful labels.

The illustrated waterfall snapshot examples are from two events. Waterfall snapshot 400 (FIG. 4A) is from a homepage load of an example website (e.g., quickbooks.com) at a time stamp of 6 seconds after a user triggered the launch. Waterfall snapshot 450 (FIG. 4B) is the same event after 24 seconds, as captured from a different data collection source. In these examples, about 60% of requests are in progress state post 6 seconds and all are loaded at 8.75 seconds in the 24 second capture. This is a normal pattern that is frequently encountered in normal loading of websites in response to user requests. These example waterfall snapshots can be useful inputs to the system 100 for learning as part of process 200.

Returning to FIG. 2, at 206, system 100 can receive additional data describing the event. For example, system 100 may obtain at least one of server logs, application logs, database logs, application programming interface (API) gateway logs, and performance metrics. This additional data is correlated in time with the snapshots obtained at 202, and can therefore be understood as describing the same event. As noted above, human users performing a labeling task at 204 may also have access to this data, and it may help them understand how to label. However, it may also be useful to feed the additional data to system 100 to enable more accurate model building as described below.

At 208, system 100 can cluster the labeled plurality of image snapshots and the additional data using at least one machine learning clustering algorithm. For example, system 100 can use an unsupervised clustering algorithm to cluster the image snapshots and the additional data based purely on their intrinsic characteristics rather than based on the labels applied at 204. Any known or novel unsupervised clustering algorithm may be chosen to yield clusters that are formed according to the selected algorithm, such as K-means, hierarchical clustering, Density-Based Spatial Clustering of Applications with Noise (DBSCAN), and Gaussian Mixtures Model (GMM). Some embodiments may use supervised clustering, but due to the labeling described above, supervised clustering is not necessary unless desired for other reasons of design choice. That is, because of the labeling at 204, it may be possible to ascertain the meaning of the clusters based on what was grouped together. For example, system 100 may automatically label clusters with the highest frequency label appearing in the cluster (or a related term), or system 100 may report on the content of the clusters through a UI and receive user input of labels for the clusters in response.

System 100 can run the at least one machine learning clustering algorithm multiple times, depending on how many types of data are being used. Like data may be clustered with other like data, so system 100 will run the algorithm once per data type. At minimum, system 100 can cluster the labeled plurality of image snapshots. Separately, system 100 can cluster each separate type of additional data. For example, if the additional data includes server logs, application logs, database logs, API gateway logs, and performance metrics, system 100 will cluster the data in each of these data sets separately. In this example, system 100 will run the algorithm a total of six times (once for the image snapshots, once for the server logs, once for the application logs, once for the database logs, once for the API gateway logs, and once for the performance metrics). This produces one or more clusters for each set of data (a total of six sets of one or more clusters in this example).

At 210, system 100 can merge the clustered plurality of image snapshots and the clustered additional data into merged data. After the processing at 208, system 100 will have at least one cluster for each data source. However, these respective clusters for respective data sources are not yet related to one another. Accordingly, system 100 can merge them with one another based on the time sequence or time stamp. For example, the browser image of waterfall clusters captured at 6 seconds, gateway-log/image cluster sets at 7 seconds, and app server log clusters at 7.2 seconds can be stitched logically against one event having a traceability identifier such as tid (transaction ID). Because they are all collocated in time, each of these clusters are merged with one another and used to represent the same event within the remainder of process 200.

At 212, system 100 can create a model by processing the merged data using at least one neural network. For example, system 100 can input the merged data as training data for a ML algorithm. In one example, system 100 trains a convolutional neural network (CNN) or other neural network with each set with respective boosts for anomaly tolerance ranges and parameters. For example, two sub steps for training with back propagation can be added. First, system 100 can create missing data in a cluster using noise cancellation techniques such as autoencoding or GAN after doing the CNN training, which may reduce noise and unwanted features and/or parameters. Second, system 100 can use a back propagation technique to train previously gathered clustering algorithm/function data of time stamp based events to identify new patterns (e.g., these may be anomalies which can be found by human intervention using heuristic methods to further classify). In this technique, the training may be considered "semi supervised," where unknown patterns are found and classified numerically, and those patterns quickly draw human attention, enabling a user to heuristically detect any threat or customer failure. Thus this technique predicts anomalies based on a few past anomalies from time series image data of the same type of event.

For waterfall snapshots, this can yield a regression model for each class identified by the training, such that each event type can be mapped to a regression function in the model that can correspond with the regression function illustrated in the visual representation of the waterfall snapshots themselves. Such a model may be used to identify a variety of issues.

For example, a neural network can be trained to identify a ranked set of most probable reasons that customers drop off a the product after the end of trials, and then can be used to detect patterns with anomalies related to identity theft. The neural network exhibits waterfall patterns that are common to legitimate users, and the waterfall pattern of an identity thief will appear different from those of an honest customer. The intruder's visiting patterns are evident during the noise removal phase (autoencoding) and are exhibited as a higher degree of errors while trying to re-classify by the CNN.

In another example, logo fraud detection may be performed based on labeled clusters of known branding images. In an example use case of a production failure (which is used in the training), content delivery network (CDN) logs and storage side logs may be used to detect a spike in a pattern where multiple uploads of a same set of a few images are suggested by the classifier from multiple users, including a high decree of errors (e.g., noise levels in a sequence of events across events were significantly low, i.e., approximately zero). That created a new pattern in the clustering, predicting a potential application black out of a system serving logos through a CDN. Cluster created new patterns with a high degree of error in the noise cancellation step can be useful for detecting anomalies such as threads.

In other examples, similar techniques can be applied to different types of images in different fields of endeavor altogether. For example, similar techniques can be used for detecting automobile traffic patterns and clustering them using images using multiple source cameras (e.g., placed to capture different portions of a curved or a zig-zag road). Unusual traffic patterns corresponding with an accident or bad road conditions may be recognized based on the clusters, so that when similar images are gathered in the future, warnings may be displayed to drivers approaching the area where the images are gathered, alerting them to a potential traffic problem ahead.

System 100 can store the model in a memory of system 100 or otherwise accessible to system 100. The model is configured to detect future events of a same type as the modeled event. For example, as described below with respect to FIG. 5, new images collected from monitoring the monitored system 10 can be fed to the stored model and used to detect events in the monitored system 10.

Figure 3:
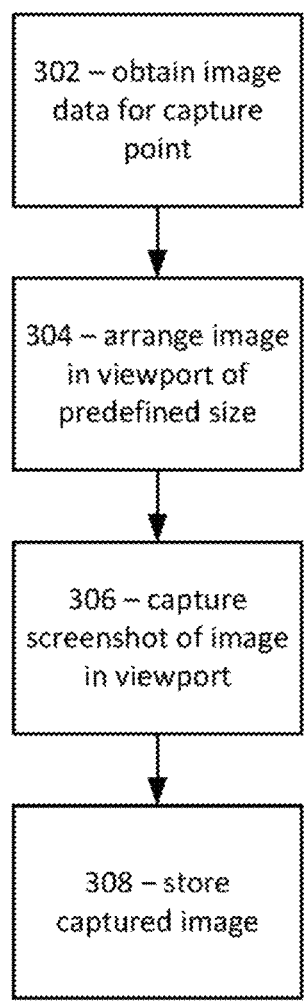
FIG. 3 shows an example image capture process according to some embodiments of the disclosure.

FIG. 3 shows an example image capture process 202/502 according to some embodiments of the disclosure. System 100 can use the depicted image capture process in model building process 200 at 202, for example, in order to obtain image data to train the model. In this case, system 100 can perform image capture process 202 a plurality of times, for example at each designated or periodic capture point in time. As described below, system 100 can also use the depicted image capture process when the trained model is used to detect events in the monitored system 10 (e.g., see process 500 at 502). In this case, system 100 can perform image capture process 502 one time or multiple times, and at least one captured image can be used to detect an event.

At 302, system 100 can obtain image data. For example, system 100 can be configured to trigger image capture processing after a specified elapsed time, or at a specified particular time. System 100 can request image data and/or gather image data being actively gathered. For example, in the case of a waterfall snapshot, system 100 may load a snapshot for a specified set of network activity, such as a waterfall of network activity triggered by a specified request, or a set of network activity during a time period of a specified duration, or a set of a specified number of network request and/or response occurrences. Some embodiments may function by having system 100 obtain image data of a specific size (e.g., specific number of request/response occurrences, specific duration, etc.) for all instances of image capture process 202 for each of the plurality of times.

At 304, system 100 can arrange the image in a viewport of a predefined size. Each image captured by repeated instances of image capture process 202/502 can be arranged in viewports all having the same predefined size. In one example, the viewport may be a window displayed in a UI. In another example, the viewport may be a definition of vertical and horizontal dimensions for the image data obtained at 302 that need not be actually displayed on a user-visible UI display.

At 306, system 100 can capture a screenshot of the image in the viewport. For example, system 100 can leverage screenshot functionality built into an operating system or application executed by one or more computers of system 100 to capture the screenshot. Because the viewport was specified to have a consistent predetermined size at 304, each snapshot captured by system 100 during each instance of process 202/502 will have the same vertical and horizontal dimensions. In some embodiments, the screenshot can be cropped to contain only the viewport and/or its contents. In some embodiments, the viewport may be arranged to have a maximum area provided by one or more computers of system 100 (e.g., a maximized window), so the screenshot may contain substantially only the viewport without cropping.

At 308, system 100 can store the image captured at 306, for example in a memory of system 100 or otherwise accessible to system 100. Thereafter, the image captured at 306 can be available for use in further processing of process 200 or process 500, as described herein.

Figure 5:
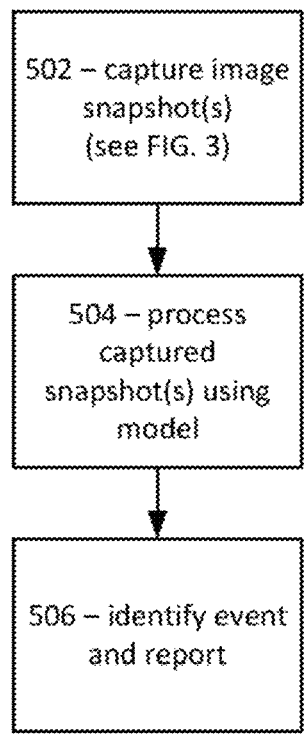
FIG. 5 shows an example event detection process according to some embodiments of the disclosure.

FIG. 5 shows an example event detection process 500 according to some embodiments of the disclosure. System 100 can perform process 500 to detect events in monitored system 10 based on visual information and using an event detection model. For example, network waterfall snapshots can be fed to the model and used to detect anomalous network behavior and/or traffic, as described in detail below.

At 502, system 100 can capture at least one image snapshot representing a status of monitored system 10 (e.g., a waterfall snapshot of a given time period or for a given set of transactions in the network). An example process for capturing the image snapshots is described above with reference to FIG. 3. As noted above, system 100 can capture images at a consistent size scale (e.g., where each image has the same horizontal and vertical (x,y) dimensions), so that recurring elements in the images are at consistent positions and have consistent sizing from snapshot to snapshot.

At 504, system 100 can process the snapshot(s) captured at 502 using a trained model, such as the model produced by process 200. For example, system 100 can use the same algorithm used to create the model in process 200 (e.g., a CNN or other neural network) and process the snapshot(s) captured at 502 against the model stored at 212 in process 200. As an output, the algorithm will provide a classification of the snapshot(s) according to the model. For example, anomalous network traffic can be indicated as such (e.g., processing at 504 can indicate that the waterfall snapshot shows a likely network attack, connectivity problem, or the like).

At 506, system 100 can identify an event in the monitored system 10 and report and/or take action in response. For example, if the processing at 504 does not indicate an anomalous event in monitored system 10, system 100 may report that all is well or may do nothing. However, if the processing at 504 indicates an anomalous event in monitored system 10, system 100 may flag the event for further review, at which point it may be passed to another analysis system or a human analyst for further evaluation. In this way, system 100 may function as a first filter for identifying potential issues with the monitored system 10. In other embodiments, system 100 may function as a primary identifier of issues, such that after an issue is identified, system 100 can provide feedback and/or directly control monitored system 10. For example, if one or more anomalies are detected, system 100 can alert a user to the issue, shut down or block access to monitored system 10 to prevent an attack or other failure, cause a setting of monitored system 10 to be adjusted to attempt to revert its behavior to a normal state, etc.

Figure 6:
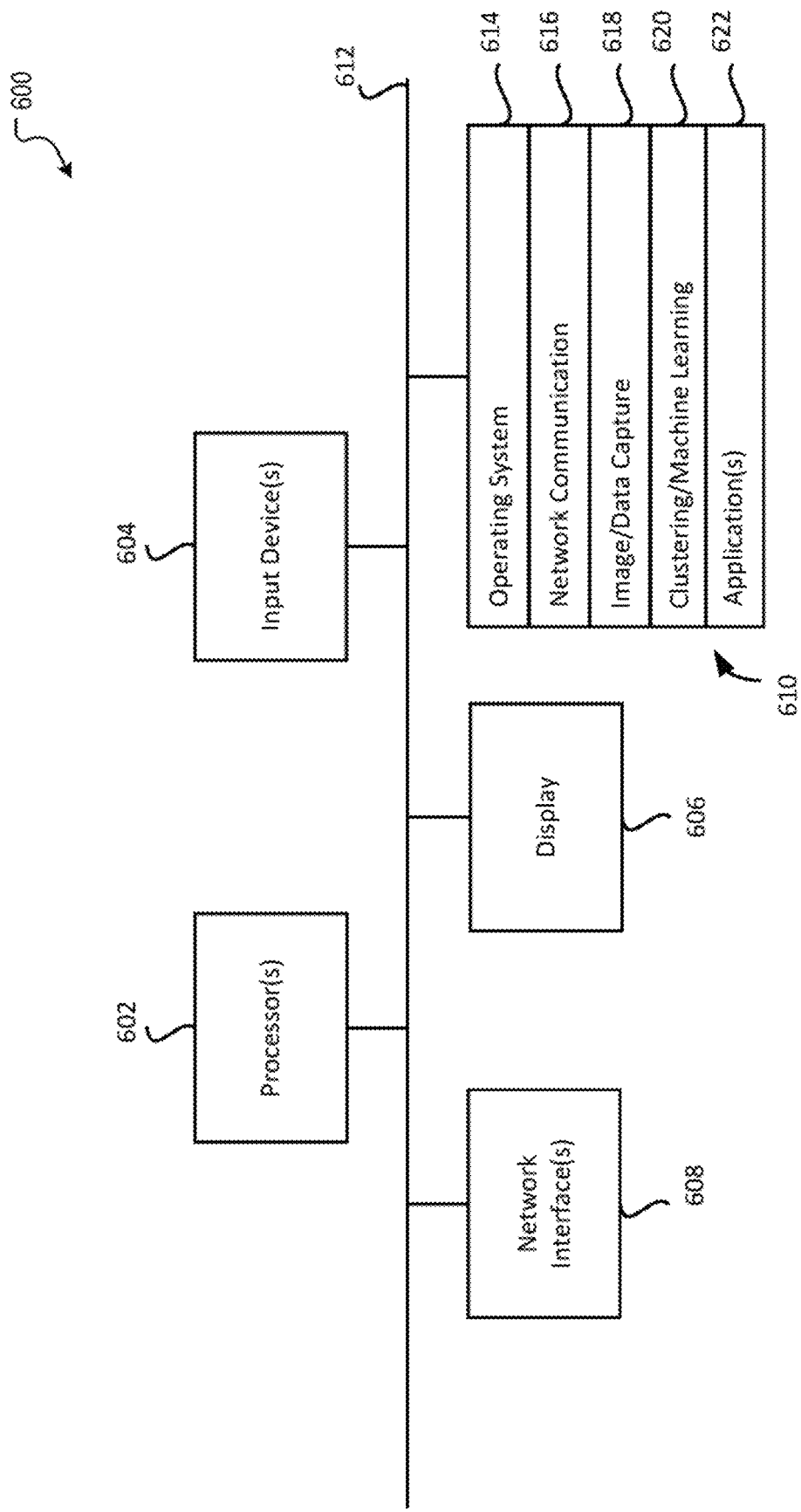
FIG. 6 shows a computing device according to some embodiments of the disclosure.

FIG. 6 shows a computing device 600 according to some embodiments of the disclosure. For example, computing device 600 may function as system 100 or any portion(s) thereof, or multiple computing devices 600 may function as system 100.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Image/data capture instructions 618 may enable computing device 600 to perform image and/or data capture functions described above. Clustering/ML instructions 620 may enable computing device 600 to perform clustering and/or ML functions described above. Application(s) 622 may be an application that uses or implements the processes described herein and/or other processes. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   capturing, by at least one processor, a plurality of image snapshots containing information about a monitored system, each snapshot being captured at a different one of a plurality of sequential times, and each snapshot having the same vertical and horizontal dimensions;
   labeling, by the at least one processor, the plurality of image snapshots as indicative of an event that took place in the monitored system during the plurality of sequential times;
   receiving, by the at least one processor, additional data describing the event;
   clustering, by the at least one processor, the labeled plurality of image snapshots and the additional data using at least one machine learning clustering algorithm;
   merging, by the at least one processor, the clustered plurality of image snapshots and the clustered additional data into merged data;
   creating, by the at least one processor, a model by processing the merged data using at least one neural network, the model being configured to detect future events of a same type as the event in the monitored system, wherein processing using the at least one neural network comprises boosting for anomaly tolerance ranges and parameters; and
   storing, by the at least one processor, the model in a memory in communication with the at least one processor.

2. The method of claim 1, wherein the capturing comprises, for each snapshot:
   arranging an image into a viewport of a same predefined size; and
   capturing a screenshot of the image in the viewport.

3. The method of claim 1, further comprising:
   receiving, by the at least one processor, at least one additional image snapshot containing information about the monitored system, each of the at least one additional image snapshots being captured at a different one of a second plurality of sequential times, and each at least one additional image snapshot having the same vertical and horizontal dimensions as the plurality of image snapshots;
   processing, by the at least one processor, the at least one additional image snapshot and the model using the at least one neural network;
   identifying, by the at least one processor, a second event that took place in the monitored system as a result of the processing of the at least one additional image snapshot and the model using the at least one neural network; and
   reporting, by the at least one processor, the second event to a user.

4. The method of claim 1, wherein the labeling comprises receiving labeling information through at least one user interface.

5. The method of claim 1, wherein the information about the monitored system comprises a network waterfall image.

6. The method of claim 1, wherein the additional data comprises at least one of server logs, application logs, database logs, application programming interface gateway logs, and performance metrics.

7. A method comprising:
capturing, by at least one processor, at least one image snapshot containing information about a monitored system, each at least one image snapshot being captured at a different one of a plurality of sequential times, and each at least one image snapshot having the same vertical and horizontal dimensions;
processing, by the at least one processor, the at least one image snapshot and a model using at least one neural network, the model being produced by the at least one neural network based on a plurality of prior image snapshots containing information about the monitored system, each prior snapshot being captured at a different one of a plurality of prior sequential times, and each prior snapshot having the same vertical and horizontal dimensions as the at least one image snapshot, and the model being configured to detect events in the monitored system, wherein processing using the at least one neural network comprises boosting for anomaly tolerance ranges and parameters;
identifying, by the at least one processor, an event that took place in the monitored system as a result of the processing of the at least one image snapshot and the model using the at least one neural network; and
reporting, by the at least one processor, the event to a user.

8. The method of claim 7, wherein the capturing comprises:
arranging an image into a viewport of a same predefined size; and
capturing a screenshot of the image in the viewport.

9. The method of claim 7, wherein the information about the monitored system comprises a network waterfall image.

10. A system comprising:
at least one processor;
a network transceiver in communication with the at least one processor; and
a non-transitory memory in communication with the at least one processor storing instructions that, when executed by the processor, cause the processor to perform processing comprising:
receiving information about a monitored system through the network transceiver;
capturing a plurality of image snapshots representing the information about the monitored system, each snapshot being captured at a different one of a plurality of sequential times, and each snapshot having the same vertical and horizontal dimensions;
labeling the plurality of image snapshots as indicative of an event that took place in the monitored system during the plurality of sequential times;
receiving additional data describing the event through the network transceiver, locally from the non-transitory memory, or a combination thereof;
clustering the labeled plurality of image snapshots and the additional data using at least one machine learning clustering algorithm;
merging the clustered plurality of image snapshots and the clustered additional data into merged data;
creating a model by processing the merged data using at least one neural network, the model being configured to detect future events of a same type as the event in the monitored system,
receiving at least one additional image snapshot containing information about the monitored system, each of the at least one additional image snapshots being captured at a different one of a second plurality of sequential times, and each at least one additional image snapshot having the same vertical and horizontal dimensions as the plurality of image snapshots;
processing the at least one additional image snapshot and the model using the at least one neural network;
identifying a second event that took place in the monitored system as a result of the processing of the at least one additional image snapshot and the model using the at least one neural network;
reporting the second event to a user; and
storing the model in the non-transitory memory.

11. The system of claim 10, wherein the capturing comprises, for each snapshot:
arranging an image into a viewport of a same predefined size; and
capturing a screenshot of the image in the viewport.

12. The system of claim 11, wherein the instructions further cause the at least one processor to perform processing comprising executing a browser application comprising the viewport.

13. The system of claim 10, wherein the processing using the at least one neural network comprises boosting for anomaly tolerance ranges and parameters.

14. The system of claim 10, wherein the reporting comprises sending a message to the monitored system through the network transceiver.

15. The system of claim 10, wherein the labeling comprises receiving labeling information through at least one user interface.

16. The system of claim 10, wherein the information about the monitored system comprises a network waterfall image.

17. The system of claim 10, wherein the additional data comprises at least one of server logs, application logs, database logs, application programming interface gateway logs, and performance metrics.

18. The method of claim 1, wherein the parameters are at least one of a constant, a key, a data structure, an object, an object class, a variable, a data type, a pointer, an array, a list, or another call.

19. The method of claim 7, wherein the parameters are at least one of a constant, a key, a data structure, an object, an object class, a variable, a data type, a pointer, an array, a list, or another call.

20. The system of claim 13, wherein the parameters are at least one of a constant, a key, a data structure, an object, an object class, a variable, a data type, a pointer, an array, a list, or another call.

* * * * *